United States Patent
Nagasawa et al.

(10) Patent No.: US 9,902,363 B2
(45) Date of Patent: Feb. 27, 2018

(54) AIRBAG DEVICE

(71) Applicant: Fuji Jukogyo Kabushiki Kaisha, Tokyo (JP)

(72) Inventors: Isamu Nagasawa, Tokyo (JP); Shinya Inoue, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 0 days.

(21) Appl. No.: 14/660,777

(22) Filed: Mar. 17, 2015

(65) Prior Publication Data

US 2015/0274114 A1    Oct. 1, 2015

(30) Foreign Application Priority Data

Mar. 28, 2014 (JP) ................................ 2014-068446

(51) Int. Cl.
*B60R 21/231* (2011.01)
*B60R 21/2334* (2011.01)
*B60R 21/20* (2011.01)

(52) U.S. Cl.
CPC ............ *B60R 21/231* (2013.01); *B60R 21/20* (2013.01); *B60R 21/2334* (2013.01); *B60R 2021/23176* (2013.01)

(58) Field of Classification Search
CPC ... B60R 21/231; B60R 21/20; B60R 21/2334; B60R 2021/23176
See application file for complete search history.

(56) References Cited

U.S. PATENT DOCUMENTS

| | | | | |
|---|---|---|---|---|
| 4,955,658 A | * | 9/1990 | Graves | B60N 3/063 296/75 |
| 6,158,766 A | * | 12/2000 | Kowalski | B60N 3/04 280/730.1 |
| 6,371,511 B1 | * | 4/2002 | Kitagawa | B60R 21/02 280/730.1 |
| 6,578,867 B2 | * | 6/2003 | Khoudari | B60R 21/231 280/730.1 |
| 6,962,368 B2 | * | 11/2005 | Hjerpe | B60N 3/06 280/751 |

FOREIGN PATENT DOCUMENTS

| | | | | |
|---|---|---|---|---|
| DE | 19727598 A1 | * | 1/1999 | ............ B60N 3/066 |
| DE | 102009055837 A1 | | 6/2011 | |
| JP | H 11-11242 A | | 1/1999 | |
| JP | 2000289562 A | * | 10/2000 | |
| JP | 2008-254523 A | | 10/2008 | |
| JP | 2008260376 A | * | 10/2008 | |

OTHER PUBLICATIONS

Chinese Office Action dated, Nov. 23, 2016, in CN 2015/10132148. 5, with a partial English translation thereof.

* cited by examiner

*Primary Examiner* — Darlene P Condra
(74) *Attorney, Agent, or Firm* — McGinn I.P. Law Group, PLLC.

(57) ABSTRACT

An airbag device includes an airbag body that inflates and deploys between a foot of a seated person and a floor panel of a vehicle. The airbag body includes: a rear inflating portion inflatable rearwardly from a heel of the seated person and upwardly higher than a bottom face of the foot in the inflation and deployment form of the airbag body, and a front inflating portion inflatable forwardly from a toe of the seated person and upwardly higher than a bottom face of the foot in the inflation and deployment form of the airbag body.

19 Claims, 4 Drawing Sheets

AIRBAG DEVICE

CROSS-REFERENCE TO RELATED APPLICATIONS

The present application claims priority from Japanese Patent Application No. 2014-068446 filed on Mar. 28, 2014, the entire contents of which are hereby incorporated by reference.

BACKGROUND

1. Technical Field

The present disclosure relates to an airbag device, particularly, to an airbag device having an airbag body that inflates and deploys between a leg of a seated person and the floor panel of a vehicle.

2. Related Art

In some collisions a force is applied to a leg of a passenger due to an impact at the time of a collision of a vehicle, the force including a vehicle width direction moment (hereinafter also referred to as a transverse moment) Mx, a vehicle fore-and-aft direction moment (hereinafter also referred to as a fore-and-aft moment) My, and an axis direction load (hereinafter also referred to as an axial load) Fz. As a result, the leg is thrown in an unexpected direction and damaged.

In order to protect a leg against the above-mentioned moments and the axial load, there are known techniques that protect the leg by inflating an airbag at the time of a collision.

For example, Japanese Unexamined Patent Application Publication (JP-A) No. 11-11242 discloses a technology in which a stopper member for receiving the heel of a foot of a seated person is formed by an airbag. The stopper member is placed on the floor surface of a vehicle cabin to protect the heel from being pushed into between an operating pedal and the floor panel due to the moment My caused by an impact of a collision.

For another example, an airbag device disclosed in Japanese Unexamined Patent Application Publication (JP-A) No. 2008-254523 includes an airbag having a. The heel rest base is disposed on the floor of a vehicle forwardly of a front seat and, both heels of a passenger seated on the front seat are placeable on the heel rest. The airbag device is capable of preventing dorsiflexion and twist of the ankles of the seated passenger by inflation of the airbag.

It is known that an impact load at the time of a head-on collision of a vehicle occurs in two stages for an initial load and a latter load. That is, an initial load is caused by an inertial force that is generated by a collision, and the latter load is caused by deformation of the vehicle body, such as rearward movement of a toe board. FIG. 4 is a schematic graph illustrating the two stage load.

Here, an inertial force is applied to the legs of a seated person due to a load F1 in the first stage at time t=t1, and thus a high axial load Fz occurs. In addition, a so-called lift up phenomenon is induced in which a latter load F2 in the second stage at time t=t2 causes deformation of the vehicle body, and thus a high vehicle fore-and-aft direction moment My to a foot causes a corresponding leg to be thrown forward on the floor panel in the vehicle body.

Although the technology of JP-A No. 11-11242 is capable of preventing a foot from being caught between the floor panel and the operating pedal, only the central portion of the bottom surface of the foot is buffered by an airbag, and a buffering effect for protecting the leg from the above-mentioned axial load Fz is not sufficiently obtained. Furthermore, the disclosure of JP-A No. 11-11242 does not provide the effect of protecting the leg from lift up of the floor panel due to the vehicle fore-and-aft direction moment My.

The technology described in JP-A No. 2008-254523 protects a heel with the heel rest base, and thus an effect for protecting the leg from the axial load Fz is obtained to some extent. However, no approach is made at all to prevent the lift up of the floor panel due to the vehicle fore-and-aft direction moment My.

SUMMARY OF THE INVENTION

The present disclosure has been made in view of the above-described problem and an object thereof is to provide an airbag device capable of reliably prevent damage to the legs of a seated person due to an axial load and a vehicle fore-and-aft direction moment at the time of a vehicle collision.

In an aspect of the disclosure provides an airbag device including an airbag body that inflates and deploys between a leg of a seated person and a floor panel of a vehicle. The airbag body includes: a rear inflating portion inflatable rearwardly from a heel of a seated person and upwardly higher than a bottom face of a corresponding foot in inflation and deployment form of the airbag body, and a front inflating portion inflatable forwardly from a toe of the seated person and upwardly higher than a bottom face of the foot in inflation and deployment form of the airbag body.

The airbag body may include a heel side inflating portion inflatable laterally from the heel of the seated person and upwardly higher than the bottom face of the foot in inflation and deployment form of the airbag body, and a toe side inflating portion inflatable laterally from the toe of the seated person and upwardly higher than the bottom face of the foot in inflation and deployment form of the airbag body.

In the airbag body, the rear inflating portion and the front inflating portion may be integrally formed.

In the airbag body, the rear inflating portion and the heel side inflating portion may inflate and deploy in an initial stage of a collision, and the front inflating portion and the toe side inflating portion may inflate and deploy in a latter stage of the collision.

The floor panel may be provided with either one of an operating pedal or a footrest, and the airbag body may inflate and deploy so as to cover the either one of the operating pedal or the footrest.

DETAILED DESCRIPTION (First Implementation)

An implementation according to the present disclosure will be described in detail with reference to the accompanying drawings. In the present implementation, an example will be described in which an airbag device 10 is applied to the floor panel of the driver's seat of a vehicle.

Figure 1A:
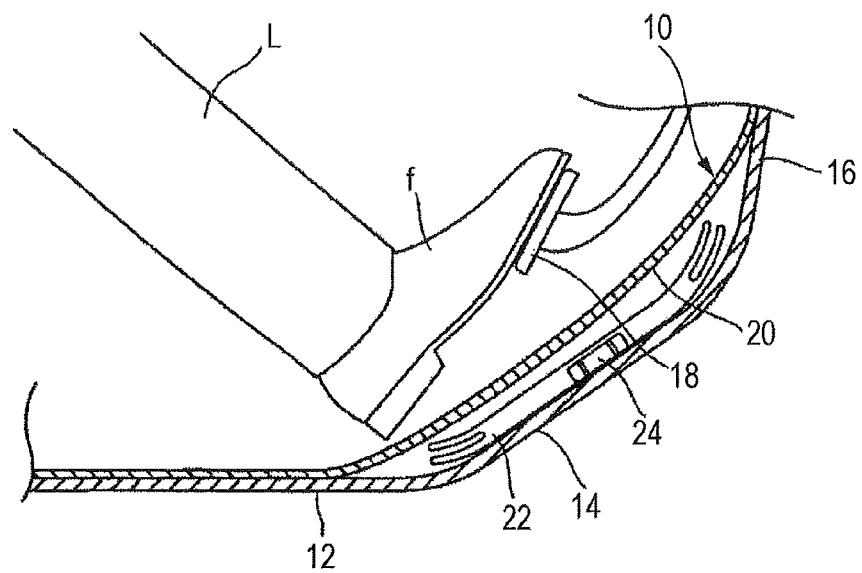
FIGS. 1A and 1B are each an illustration depicting the manner of inflation and deployment of an airbag body of an airbag device according to a first implementation of the present disclosure.
Figure 1B:
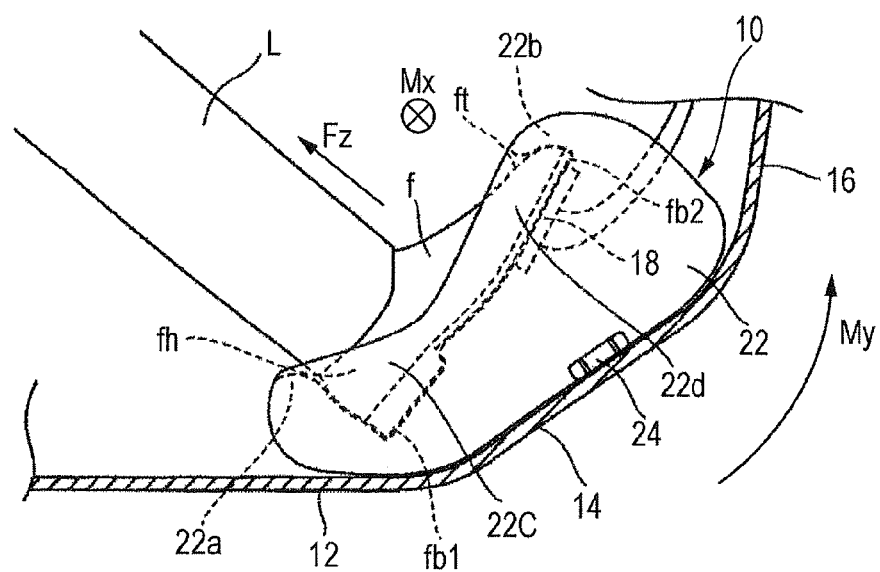
Figure 2:
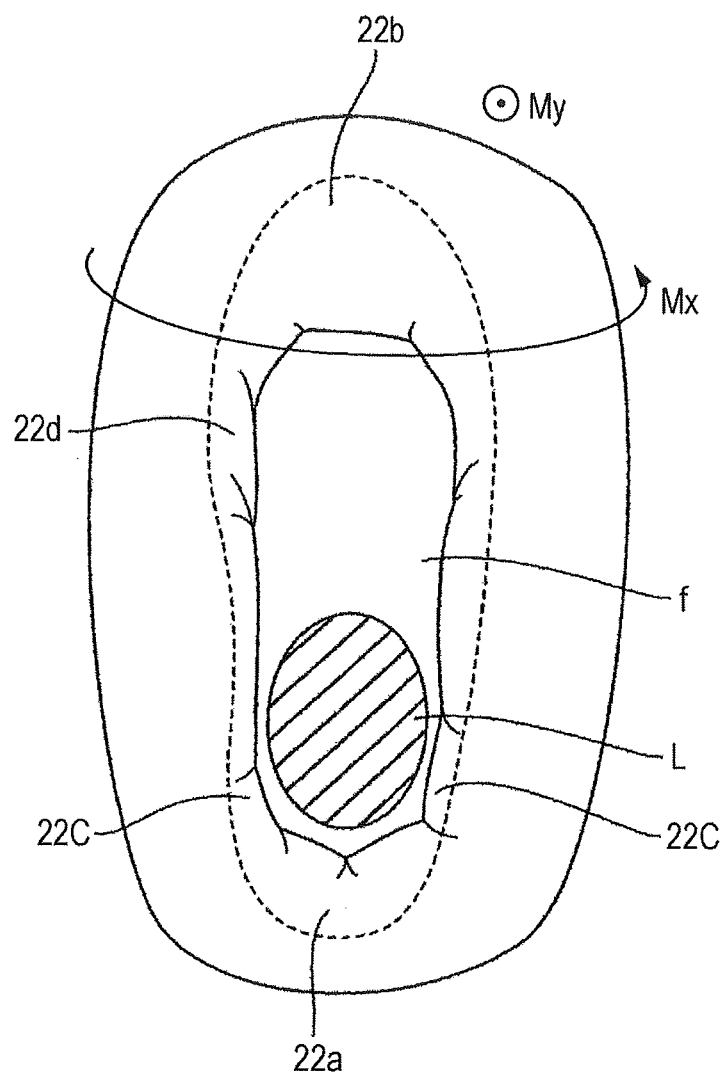
FIG. 2 is an illustration depicting the manner of inflation and deployment of the airbag body of the airbag device according to the first implementation.

FIGS. 1A, 1B and FIG. 2 are each an illustration depicting the manner of inflation and deployment of the airbag body of the airbag device according to the present implementation.

As depicted in FIG. 1A, a floor panel 12 on the driver's seat has a toe board 14 that extends upwardly forward from the front end of the floor panel 12, and a dashboard 16 that extends upward from the upper end of the toe board 14. Also, an operating pedal 18 such as an accelerator pedal is disposed at a position nearer to a seated person than the dashboard 16. FIG. 1A illustrates a situation in which a foot f of a leg L of a seated person is placed on the operating pedal 18.

In the present implementation, an outer layer 20 such as a carpet is formed diagonally under the operating pedal 18 over the toe board 14, and a folded non-elastic airbag body 22 including an inflator 24 is stored within the outer layer 20.

The airbag device 10 according to the present implementation includes the airbag body 22 and the inflator 24.

At the time of a collision, upon receiving a signal from an acceleration sensor (not illustrated), the inflator 24 is activated, thereby causing the airbag body 22 to inflate and deploy. The airbag body 22, when inflating and deploying, breaks through the outer layer 20 so as to cover the foot f of a seated person.

Figure 4:
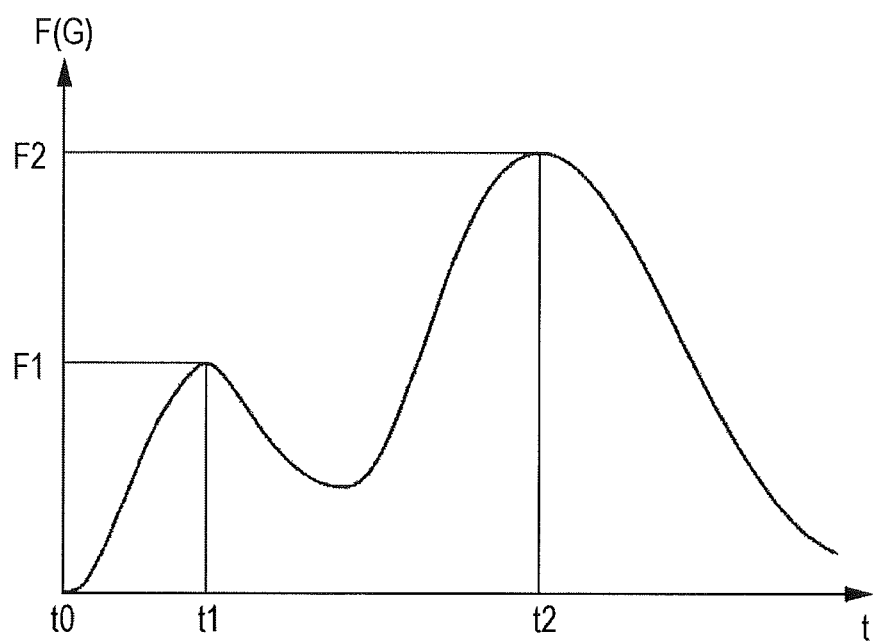
FIG. 4 is a graph illustrating a distribution over time of an impact load at the time of a head-on collision of a vehicle.

More particularly, in the present implementation, when a load due to a collision is detected by the acceleration sensor (for example, at t=t0 in FIG. 4), the inflator 24 is activated and gas is introduced through a pipe (not illustrated) to cause the airbag body 22 to inflate and deploy. At this moment, the airbag body 22 forms a rear inflating portion 22a and a front inflating portion 22b, the rear inflating portion 22a in its inflation and deployment form being inflatable rearwardly from a heel fh of a seated person and upwardly higher than a bottom face fb1 of the foot, the front inflating portion 22b in its inflation and deployment form being inflatable forwardly from a toe ft of the seated person and upwardly higher than a bottom face fb2 of the foot.

In addition, in the present implementation, the airbag body 22 forms heel side inflating portions 22c and toe side inflating portions 22d, the heel side inflating portions 22c in its inflation and deployment form being inflatable laterally from the heel fh of the seated person and upwardly higher than the bottom face fb1 of the foot, the toe side inflating portions 22d in its inflation and deployment form being inflatable laterally from the toe ft of the seated person and upwardly higher than the bottom face fb2 of the foot.

Consequently, at the time of a collision, the airbag body 22 inflates so as to cover the heel fh of the foot of a seating person by the rear inflating portion 22a, and cover the toe ft of the seating person by the front inflating portion 22b.

Accordingly, an axial load Fz due to a vehicle collision is buffered by part of the rear inflating portion 22a that covers the heel fh of the foot, and thus damage to the leg L of a seated person due to the axial load Fz is protected. In addition, a moment My in the fore-and-aft direction of the vehicle body is buffered by part of the front inflating portion 22b that covers the toe ft of the foot, and thus damage to the leg due to lift up phenomenon is protected in which the leg L of the seated person is pushed forward by the moment My in the fore-and-aft direction of the vehicle body.

Furthermore, the above-described heel side inflating portions 22c and toe side inflating portions 22d are capable of entirely covering and holding the sides of the foot, and thus a lateral moment Mx may be buffered, which may cause the leg f of a seated person to be twisted in a vehicle width direction at the time of a collision. Consequently, damage to the leg L of a seated person at the time of a collision may be protected more reliably.

Particularly, in the present implementation, as clearly seen from FIG. 1B, the airbag body 22 inflates and deploys so as to cover the operating pedal 18 on the floor panel 12. In this manner, the airbag body 22 inflates and deploys so as to cover the operating pedal 18 on which a foot of a seated person is probably placed at the time of a collision, thereby reliably protecting the leg L of the seated person from damage due to the collision.

(Second Implementation)

Figure 3A:
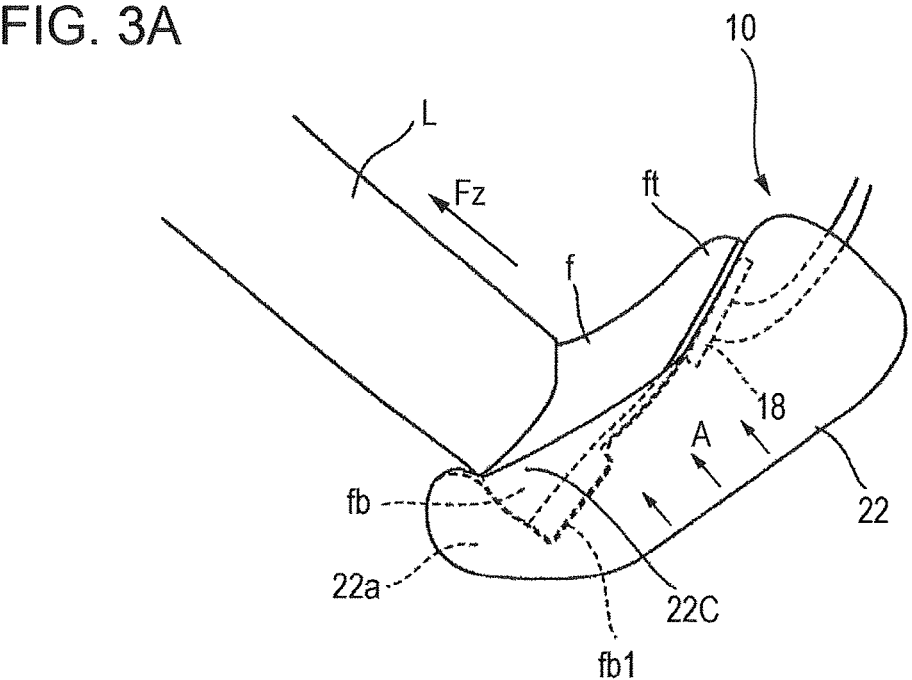
FIGS. 3A and 3B are each an illustration depicting the manner of inflation and deployment of an airbag body in an airbag device according to a second implementation.
Figure 3B:
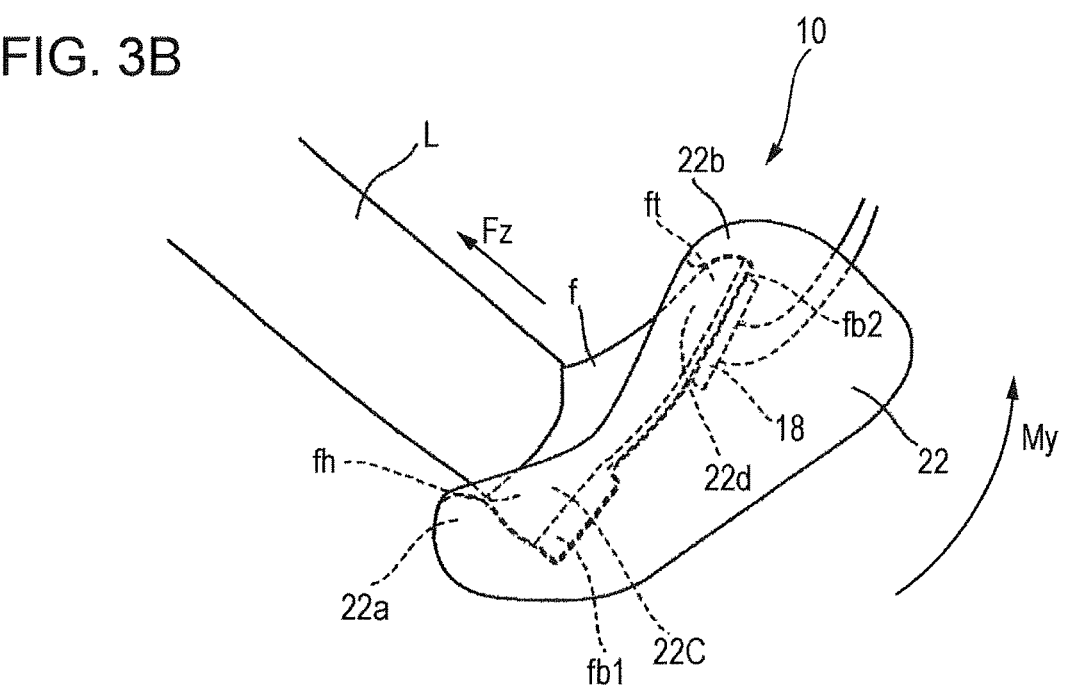

Hereinafter, a second implementation will be described in detail with reference to the accompanying drawings. It should be noted that the same elements as in the first implementation will be denoted by the same symbol and a description will be omitted. FIGS. 3A and 3B schematically illustrate the manner of inflation and deployment of the airbag body 22 according to the present implementation. It should be noted that the toe board 14, the dashboard 16, and the inflator 24 are not illustrated for the sake of simplification of the drawing.

The feature of the airbag device 10 according to the present implementation is that in an initial stage of a collision, as illustrated in FIG. 3A, the airbag body 22 inflates entirely in the direction (the direction of arrow A of in FIG. 3A) in which the axial load F received by the leg L is cancelled, and the rear inflating portion 22a and the heel side inflating portions 22c of the airbag body 22 inflate and deploy. Subsequently, in a latter stage of the collision, as illustrated in FIG. 3B, the front inflating portion 22b and the toe side inflating portions 22d inflate and deploy.

That is, the time for inflation and deployment is shifted between the rear, heel side inflating portions 22a and 22c and the front, toe side inflating portions 22b and 22d.

In the present implementation, in this manner, inflow control of gas with the inflator 24 enables a configuration in which the rear inflating portion 22a and the heel side inflating portions 22c inflate and deploy in an initial stage of a collision, and the front inflating portion 22b and the toe side inflating portions 22d inflate and deploy in the latter stage of the collision, whereas all of the rear inflating portion 22a, the front inflating portion 22b, the heel side inflating portion 22c, and the toe side inflating portion 22d are integrally formed as a single airbag body 22.

Specifically, after the inflation and deployment of the rear inflating portion 22a and the heel side inflating portions 22c in an initial stage of a collision, an increase of internal pressure due to occurrence of the axial load Fz is detected, and the front inflating portion 22b and the toe side inflating portions 22d are caused to inflate and deploy. That is, when a first stage load F1 at t=t1 is detected by the above-mentioned acceleration sensor, the front inflating portion 22b and the toe side inflating portions 22d are caused to inflate and deploy.

Thus, with the airbag device according to the present implementation, the rear inflating portion 22a and the heel side inflating portions 22c inflate and deploy in an initial stage of a collision in which a first stage impact load occurs.

That is, the rear inflating portion 22a and the heel side inflating portions 22c of the airbag body 22 inflate and deploy so as to resist the axial load Fz that occurs in the first stage of a collision, and thus the axial load Fz may be buffered.

In the latter stage of the collision in which the second stage impact load occurs, the front inflating portion 22b and the toe side inflating portions 22d inflate and deploy. That is, the front inflating portion 22b and the toe side inflating portions 22*d* of the airbag body 22 inflate and deploy so as to resist the moment My in the fore-and-aft direction of the vehicle body, which occurs in the second stage of the collision, and thus the moment My in the fore-and-aft direction of the vehicle body may be buffered.

Consequently, the foot may be reliably protected against the moment My that causes movement exceeding a movable range of foot joint.

With the above-described configuration, in the present implementation, the portions of the airbag body 22 may be separately caused to inflate so as to suitably buffer the impact force Fz and the moments My, and Mx that occur with a certain time lag on the order of msec in a series of stages of a collision, and thus damage to the leg L at the time of a collision may be protected more reliably.

Furthermore, in the present implementation, as described above, all inflating portions are formed as the single integrated airbag body 22 although the times of inflation and deployment of the rear, heel side inflating portions 22*a* and 22*c* and the front, toe side inflating portions 22*b* and 22*d* are shifted. Therefore, the inflating portions are not needed to be separately formed and thus the cost for implementing the airbag body 22 may be reduced.

It should be noted that the present disclosure is not limited to the above-described implementations and various modifications may be made within the scope of the disclosure. For example, in the present implementation, the airbag device 10 is provided in the area of the footrest of the floor panel 12 under the driver's seat. However, without being limited to this, for example, it is possible to install the airbag device 10 as a module to the shaft of an operating pedal. That is, the airbag device 10 may be provided in an operating pedal such as the accelerator pedal or the brake pedal of the driver's seat.

In addition, the airbag device 10 is not necessarily provided in the driver's seat, and may be provided in, for example, a passenger seat or a backseat. In this case, similarly to the driver's seat, the airbag device 10 may be provided on the toe board at the footrest with an outer layer on the airbag device 10.

In the above-described implementation, the single airbag body 22 is integrally formed so as to include all of the rear inflating portion 22*a*, the front inflating portion 22*b*, the heel side inflating portions 22*c*, and the toe side inflating portions 22*d*. However, without being limited to this, the above-described inflation and deployment for each of the initial stage and the latter stage of a collision may be achieved, for example, by forming one airbag body for the rear inflating portion 22*a* and the heel side inflating portions 22*c* and another airbag body for the front inflating portion 22*b* and the toe side inflating portions 22*d* with the inflator 24 separately provided.

In this case, a configuration may be achieved in which in response to detection of a load at t=t0, for example, the airbag including the rear inflating portion 22*a* and the heel side inflating portions 22*c* inflate and deploy, and subsequently, in response to detection of the first load F1 (or immediately after the detection), the front inflating portion 22*b* and the toe side inflating portions 22*d* inflate and deploy, so that the times of inflation and deployment of the rear, heel side inflating portions 22*a* and 22*c* and the front, toe side inflating portions 22*b* and 22*d* are shifted.

The invention claimed is:

1. An airbag device comprising
an airbag body adapted to deploy between a foot of a seated person and a floor panel of a vehicle, and
an inflator to inflate the airbag body to be a predetermined shape,
wherein the predetermined shape includes:
a rear inflating portion having a shape configured to cover a top of the heel of the foot of the seated person, in inflation and deployment form of the airbag body, by inflating rearward of a heel of the seated person and upward of a bottom face of the foot of the seated person, and
a front inflating portion having a shape configured to cover an entire toe of the seated person, in inflation and deployment form of the airbag body, by inflating in front of a toe of the seated person and upward of a bottom face of the foot of the seated person,
wherein the inflator inflates and deploys to the rear inflating portion so as to buffer the foot of the seated person from an axial load of the foot in an initial stage of collision, and inflates and deploys to the front inflating portion so as to buffer the foot of the seated person from a moment in the fore-and-aft direction of the vehicle body in a latter stage of the collision.

2. The airbag device according to claim 1, wherein the shape includes:
a heel side inflating portion being inflatable by the inflator laterally from the heel of the seated person and upwardly higher than the bottom face of the foot, and
a toe side inflating portion being inflatable by the inflator laterally from the toe of the seated person and upwardly higher than the bottom face of the foot.

3. The airbag device according to claim 2, wherein in the airbag body, the rear inflating portion and the front inflating portion are integrally formed.

4. The airbag device according to claim 3, wherein, in the airbag body,
the rear inflating portion and the heel side inflating portion inflate and deploy in the initial stage of a collision, and
the front inflating portion and the toe side inflating portion inflate and deploy in the latter stage of the collision.

5. The airbag device according to claim 4, wherein
the floor panel is provided with either one of an operating pedal and a footrest, and
the airbag body inflates and deploys so as to cover the either one of the operating pedal and the footrest.

6. The airbag device according to claim 3, wherein
the floor panel is provided with either one of an operating pedal and a footrest, and
the airbag body inflates and deploys so as to cover the either one of the operating pedal and the footrest.

7. The airbag device according to claim 2, wherein, in the airbag body,
the rear inflating portion and a heel side inflating portion inflate and deploy in an initial stage of a collision, and
the front inflating portion and the toe side inflating portion inflate and deploy in a latter stage of the collision.

8. The airbag device according to claim 7, wherein
the floor panel is provided with either one of an operating pedal and a footrest, and
the airbag body inflates and deploys so as to cover the either one of the operating pedal and the footrest.

9. The airbag device according to claim 2, wherein, in the airbag body,
the rear inflating portion and a heel side inflating portion inflate and deploy in the initial stage of a collision, and
the front inflating portion and the toe side inflating portion inflate and deploy in the latter stage of the collision.

10. The airbag device according to claim 9, wherein
the floor panel is provided with either one of an operating pedal and a footrest, and the airbag body inflates and deploys so as to cover the either one of the operating pedal and the footrest.

11. The airbag device according to claim 2, wherein
the floor panel is provided with either one of an operating pedal and a footrest, and
the airbag body inflates and deploys so as to cover the either one of the operating pedal and the footrest.

12. The airbag device according to claim 2, wherein the rear inflating portion, the front inflating portion, the heel side inflating portion, and the toe side inflating portion inflate such that the foot is secured so as to prevent a lift up of the foot by covering a top of the foot.

13. The airbag device according to claim 1, wherein in the airbag body, the rear inflating portion and the front inflating portion are integrally formed.

14. The airbag device according to claim 13, wherein, in the airbag body,
the rear inflating portion and a heel side inflating portion inflate and deploy in the initial stage of a collision, and
the front inflating portion and a toe side inflating portion inflate and deploy in the latter stage of the collision.

15. The airbag device according to claim 14, wherein
the floor panel is provided with either one of an operating pedal and a footrest, and
the airbag body inflates and deploys so as to cover the either one of the operating pedal and the footrest.

16. The airbag device according to claim 13, wherein
the floor panel is provided with either one of an operating pedal and a footrest, and
the airbag body inflates and deploys so as to cover the either one of the operating pedal and the footrest.

17. The airbag device according to claim 1, wherein
the floor panel is provided with either one of an operating pedal and a footrest, and
the airbag body inflates and deploys so as to cover the either one of the operating pedal and the footrest.

18. The airbag device according to claim 1, wherein a lift up of the foot is prevented by adapting the front inflating portion to cover the top of the toe of the seated person.

19. The airbag device according to claim 1, wherein a bottom surface of the front inflating portion is adapted to cover a top of the toe to thereby prevent a lift up of the foot.

* * * * *